United States Patent
Gerstenberger et al.

(10) Patent No.: US 8,908,586 B2
(45) Date of Patent: Dec. 9, 2014

(54) METHOD AND ARRANGEMENT FOR DL-OTDOA (DOWNLINK OBSERVED TIME DIFFERENCE OF ARRIVAL) POSITIONING IN A LTE (LONG TERM EVOLUTION) WIRELESS COMMUNICATIONS SYSTEM

(75) Inventors: Dirk Gerstenberger, Stockholm (SE); Daniel Larsson, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 246 days.

(21) Appl. No.: 13/255,445

(22) PCT Filed: Jun. 18, 2009

(86) PCT No.: PCT/SE2009/050773
§ 371 (c)(1), (2), (4) Date: Sep. 8, 2011

(87) PCT Pub. No.: WO2010/104436
PCT Pub. Date: Sep. 16, 2010

(65) Prior Publication Data
US 2011/0317613 A1 Dec. 29, 2011

Related U.S. Application Data

(60) Provisional application No. 61/158,876, filed on Mar. 10, 2009.

(51) Int. Cl.
*H04H 20/71* (2008.01)
*H04W 64/00* (2009.01)
*H04W 36/38* (2009.01)
*H04M 11/04* (2006.01)

(52) U.S. Cl.
CPC .......... *H04W 36/385* (2013.01); *H04W 64/003* (2013.01)
USPC ...................................... 370/312; 455/404.2

(58) Field of Classification Search
None
See application file for complete search history.

(56) References Cited

U.S. PATENT DOCUMENTS

| | | | |
|---|---|---|---|
| 5,898,929 A | * | 4/1999 | Haartsen ....................... 455/462 |
| 2004/0023671 A1 | | 2/2004 | Rudolf et al. |

(Continued)

FOREIGN PATENT DOCUMENTS

| | | |
|---|---|---|
| JP | 2008182385 A | 8/2008 |
| JP | 2008537387 A | 9/2008 |

(Continued)

OTHER PUBLICATIONS

3rd Generation Partnership Project. "On OTDOA Method for LTE Positioning." TSG-RAN WG1 #56 R1-090918, Athens, Greece, Feb. 9-13, 2009.

(Continued)

*Primary Examiner* — Dang Ton
*Assistant Examiner* — Sori Aga
(74) *Attorney, Agent, or Firm* — Coats & Bennett, PLLC

(57) ABSTRACT

The present invention relates generally to methods and arrangements for positioning in a wireless communications system, such as LTE. In particular, the present invention relates to improving positioning accuracy. The invention provides methods and arrangements for scheduling positioning subframes, i.e. low interference subframes, for allowing aligning of positioning subframes across a number of cells in order to reduce the interference from data symbols of cells in the neighborhood of a cell serving the UE that is performing positioning measurements. A time instance during which transmission of the positioning subframes is to occur in a wireless communications network is selected. The base stations in the wireless communications network are informed about the selected time instance, whereupon the base stations schedule and transmit the positioning subframes based on the selected time instance, whereby the positioning subframes are aligned throughout the network.

37 Claims, 9 Drawing Sheets

(56) References Cited

U.S. PATENT DOCUMENTS

| | | | |
|---|---|---|---|
| 2006/0215618 A1* | 9/2006 | Soliman et al. | 370/337 |
| 2009/0323596 A1* | 12/2009 | Wigren et al. | 370/329 |
| 2010/0041418 A1* | 2/2010 | Edge et al. | 455/456.2 |
| 2010/0195566 A1* | 8/2010 | Krishnamurthy et al. | 370/328 |
| 2010/0216407 A1* | 8/2010 | Gormley | 455/67.11 |
| 2012/0039232 A1* | 2/2012 | Kwon et al. | 370/312 |

FOREIGN PATENT DOCUMENTS

| | | | |
|---|---|---|---|
| JP | 2009503992 A | 1/2009 | |
| RU | 2292671 C2 | 1/2007 | |
| WO | 03007508 A1 | 1/2003 | |
| WO | 03019835 A1 | 3/2003 | |
| WO | 2007013850 * | 2/2007 | H04Q 7/38 |
| WO | 2007031103 A1 | 3/2007 | |

OTHER PUBLICATIONS

3rd Generation Partnership Project. "DL OTDOA Framework." 3GPP TSG RAN WG1 Meeting #57, R1-092010, San Francisco, CA, USA, May 4-8, 2009.

3rd Generation Partnership Project. "Further Details on DL OTDOA." 3GPP TSG RAN WG1 Meeting #56bis, R1-091312, Seoul, South Korea, Mar. 23-27, 2009.

* cited by examiner

US 8,908,586 B2

METHOD AND ARRANGEMENT FOR DL-OTDOA (DOWNLINK OBSERVED TIME DIFFERENCE OF ARRIVAL) POSITIONING IN A LTE (LONG TERM EVOLUTION) WIRELESS COMMUNICATIONS SYSTEM

TECHNICAL FIELD

The present invention relates generally to methods and arrangements for positioning in a wireless communications system. In particular, the present invention relates to improving positioning accuracy by allowing for aligning of positioning subframes.

BACKGROUND

UTRAN (Universal Terrestrial Radio Access Network) is a term that identifies the radio access network of a UMTS (Universal Mobile Telecommunications System), wherein the UTRAN consists of Radio Network Controllers (RNCs) and NodeBs i.e. radio base stations. The NodeBs communicate wirelessly with mobile user equipments and the RNCs control the NodeBs. The RNCs are further connected to the Core Network (CN). Evolved UTRAN (E-UTRAN) is an evolution of the UTRAN towards a high-data rate, low-latency and packet-optimised radio access network. Further the E-UTRAN consists of NodeBs, and the NodeBs are interconnected and further connected to the Evolved Packet Core network (EPC). E-UTRAN is also being referred to as Long Term Evolution (LTE) and is standardized within the $3^{rd}$ Generation Partnership Project (3GPP).

The third generation cellular systems such as WCDMA (Wideband Code Division Multiple Access) may be equipped with a number of different positioning methods, thereby enabling location services to the cellular subscribers. These methods are generally applicable also in wireless communications systems using other radio access technologies, such as the LTE. The methods that are available include Cell identity (Cell-ID) positioning.
Enhanced cell identity (Ecell-ID) positioning
Assisted GPS (A-GPS) positioning
Downlink time difference of arrival—with idle periods in the downlink (OTDOA-IPDL) positioning
Uplink time difference of arrival (UTDOA) positioning Cell-ID positioning determines the cell to which the user equipment (UE) is connected. The position of the user is hence determined with cell granularity. Typically the radio network controller of the radio network (RAN) determines a 3-15 corner polygon that determines the geographical extension of the cell. The corners of this polygon are given as latitude, longitude pairs in the WGS84 geographical reference system. The cell-ID method is the backbone of all cellular positioning system since it is always available when the UE can be connected to the system.

Ecell-ID positioning augments the Cell-ID positioning with auxiliary information that narrows down the area that is determined by the cell polygon. A useful method in the WCDMA system is the round trip time (RTT) measurement. This measurement determines the travel time back and forth from the radio base station (RBS) to the UE and back. Using the speed of light, the distance from the known position of the RBS to the UE can be calculated, which determines a circular strip around the RBS where the UE is located. The thickness of the strip is determined by the measurement uncertainty. The Ecell-ID method is obtained by noticing that the UE is located both in the cell and in the circular strip. Hence, the UE is located in the intersection of these two geographical regions.

A-GPS positioning is an enhancement of the US military global positioning system (GPS). GPS reference receivers attached to e.g. a cellular communication system, collect assistance data that, when transmitted to GPS receivers in terminals connected to the cellular communication system, enhances the performance of the GPS terminal receivers. Typically, A-GPS accuracy can become as good as 10 meters also without differential operation. The accuracy becomes worse in dense urban areas and indoors, where the sensitivity is often not high enough for detection of the very weak signals from the GPS satellites. Advantages of A-GPS includes a high accuracy, the method easily meets the North-American emergency positioning E-911 requirements of 50 meters for 67% of all positionings and 150 meters for 95% of all positionings. A drawback is the limited indoor coverage, which is a result of the low ranging signal strengths that are obtained at ground level.

OTDOA-IPDL positioning is similar to A-GPS in that it relies on time difference of arrival measurements. However, the OTDOA-IPDL method uses UE measurements of Pilot radio (CPICH in WCDMA) signals transmitted from several RBSs. The measurement results are signalled to the RNC, where a hyperbolic trilateration method is used for calculation of the position of the UE. In order to enhance the hearability of the RBSs in the UE, there is a possibility to use idle periods in the downlink (IPDL), to attenuate the transmissions from the RBS to which the UE is connected. This reduces the interference and hence enhances the hearability of other RBSs. A tentative advantage with OTDOA-IPDL is that it theoretically provides a better indoor coverage than does A-GPS.

UTDOA positioning is another positioning method. It is similar to A-GPS in that it relies on time difference of arrival measurements. However, the UTDOA method uses RBS (or separate location measurement unit (LMU)) measurements of signals transmitted from the positioned UE. The transmitted signal is detected in a number of RBSs or LMUs, after which the measured results are signalled to a positioning node where the position of the UE is determined by a trilateration method. In order to be able to detect the time of arrival from measurements of opportunity from the UE, a reference signal first needs to be created in a master-LMU or master RBS. This is done by decoding of the signal, followed by reconstruction of the chip stream that then forms the reference signal. An advantage of UTDOA positioning is that it provides a better indoor coverage than does A-GPS. Outdoor accuracy is normally inferior to A-GPS though.

An issue with terrestrial time difference of arrival methods, i.e. OTDOA-IPDL and UTDOA, is the receiver sensitivity when positioning is considered. Theoretically, the methods can provide a 3-D position from 4 times of arrival measurements (equivalent to three time difference of arrival (pseudo) measurements). However, radio propagation conditions are far less beneficial than for A-GPS, since OTDOA-IPDL and UTDOA ranging signals propagate along the surface of the earth, whereas A-GPS signals propagate from above. The terrestrial positioning methods therefore suffer more from non-line-of-sight (LOS) propagation and multipath propagation. This results in outlier measurements, whose suppression requires the availability of excess detections i.e. detections from significantly more than the minimum number of RBSs. In practice, to achieve a useful positioning accuracy, at least 6-8 RBSs need to be detected in the UE in case OTDOA-IPDL positioning is used. For UTDOA positioning at least 6-8 RBSs need to detect the UE transmissions in order to obtain useful position estimates in practical environments.

The consequence of the above is that more remote RBSs need to be detected (OTDOA-IPDL) or detect (UTDOA). This means that lower signal strengths need to be detected with high probability. Calculations typically show that signals need to be detected down to about −40 dB C/I. Further, the pre-detection step needs to enhance the signal to about 11-13 dB C/I in order to achieve a sufficiently low false alarm rate. In essence, the processing gain for positioning purposes in any CDMA system needs to be 50-55 dB for terrestrial positioning to be useful. This is significantly more than what is needed for other services, which means that positioning sensitivity requirements need to be assessed at the definition phase of the air-interface.

For LTE, a possible positioning technique is Downlink OTDOA, using UE measurements on measurement signals, e.g. reference signals and/or synchronization signals, on multiple cells during designated low interference subframes, an example being MBSFN (Multicast Broadcast Multimedia Single Frequency Network) subframes.

However, the main problem of the third generation cellular systems positioning methods remains and can be summarized as follows:

A-GPS positioning is a high precision technology with one main drawback—indoor positioning availability.

OTDOA-IPDL and UTDOA positioning have the technical potential to provide better indoor coverage than A-GPS and to deliver good precision. However, the presently available detection sensitivities are not sufficient to provide a good enough accuracy. Rather, accuracy figures in between A-GPS and Cell-ID can be expected.

Thus, a problem in current positioning solutions for wireless communications systems such as LTE is that it is difficult to achieve sufficient positioning accuracy with reasonable receiver detection sensitivities.

SUMMARY

It is therefore an object of the present invention to provide a mechanism for improving positioning accuracy in a wireless communications system.

The present invention focuses on techniques that can relax the very hard detection sensitivity requirements. The object is achieved according to the present invention by selecting a time instance during which transmission of positioning subframes is to occur; and by informing the base stations comprised in the wireless communications network about the first time instance for allowing aligning of positioning subframes. The base stations schedule the positioning subframes based on the time instance and transmit the positioning subframes accordingly.

In accordance with a first aspect of the present invention a method in a network node for scheduling positioning subframes is provided. The network node is comprised in a wireless communications network and connected to at least a first base station. The first base station is capable of transmitting positioning subframes. The method comprises a step of selecting a first time instance during which transmission of the positioning subframes is to occur. For allowing aligning of positioning subframe the first base station is informed about the first time instance.

In accordance with a second aspect of the present invention a method in a base station for scheduling positioning subframes is provided. The base station is comprised in a wireless communications network and connected to at least one network node. The method comprises a step of receiving information about a first time instance during which transmission of positioning subframes is to occur from the at least one network node. For allowing aligning of positioning subframe scheduling of positioning subframes is based on at least the time instance. In further step the method transmits the scheduled positioning subframes.

In accordance with a third aspect of the present invention a first arrangement for scheduling positioning subframes is provided. The arrangement is adapted to be comprised in a network node, which is comprised in a wireless communications network and connected to at least a first base station. The at least first base station is capable of transmitting positioning subframes. Furthermore, the arrangement comprises a selection unit arranged to select a first time instance during which transmission of the positioning subframes is to occur. Additionally, the arrangement comprises an informing unit arranged to inform the at least first base station about the first time instance for allowing aligning of positioning subframes.

In accordance with a fourth aspect of the present invention a second arrangement for scheduling positioning subframes is provided. The arrangement is adapted to be comprised in a base station, which is comprised in a wireless communications network and connected to at least one network node. The arrangement comprises a receiving unit arranged to receive information about a first time instance during which transmission of positioning subframes is to occur from the at least one network node. Furthermore, the arrangement comprises a scheduling unit arranged to schedule the positioning subframes based on at least the first time instance for allowing aligning of positioning subframes. Additionally, the arrangement comprises a transmitting unit arranged to transmit the scheduled positioning subframes.

An advantage of the present invention is that when a number of base stations all transmit their positioning subframes at roughly the same time instance, the positioning subframes will become aligned across a number of cells. Thereby, the interference from data symbols of cells in the neighborhood of the cell serving a user equipment performing positioning measurements such as DL OTDOA measurements is reduced. Hence, the hearability in the wireless communications system is improved, which has the effect of improving the positioning accuracy without increasing the detection sensitivity in the receiver.

Other objects, advantages and novel features of the invention will become apparent from the following detailed description of the invention when considered in conjunction with the accompanying drawings.

BRIEF DESCRIPTION OF THE DRAWINGS

For a better understanding, reference is made to the following drawings and preferred embodiments of the invention.

DETAILED DESCRIPTION

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practiced in other embodiments that depart from these specific details.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

As previously mentioned, a possible positioning method for use in a cellular wireless communications system such as the LTE is the downlink time difference of arrival (DL OTDOA), using UE measurements on measurement signals, e.g. reference signals and/or synchronization signals, on multiple cells during designated low interference subframes.

Figure 1:
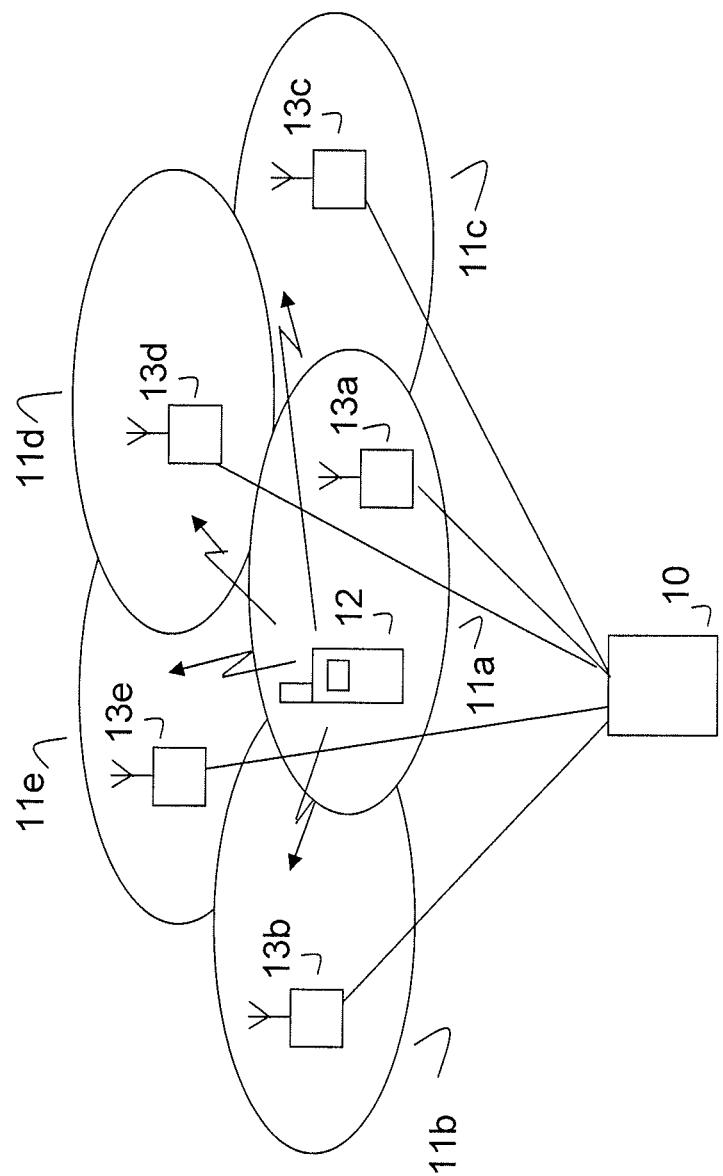
FIG. 1 illustrates a part of a cellular wireless communications system wherein the present invention may be implemented.

FIG. 1 illustrates a part of a cellular wireless communications system such as the LTE, wherein a cell is denoted 11, a base station covering the cell 11 is denoted 13 in the figure. The positioning method used in the LTE could be the DL OTDOA, using UE measurements on measurement signals, e.g. reference signals and synchronization signals, on multiple cells 11b-11e during designated low interference subframes. The UE 12 in the serving cell 11a tries to measure on the measurement signals of cells 11b-11e in the neighborhood of the serving cell 11a during designated low interference subframes transmitted from a base station 13a, i.e. an eNodeB, in the cell 11a serving the UE 12. It should however be noted that the cells 11b-11e are not necessarily strictly adjacent cells. The positioning method DL OTDOA is performed by a positioning node 10 in the cellular wireless communications system.

Figure 2:
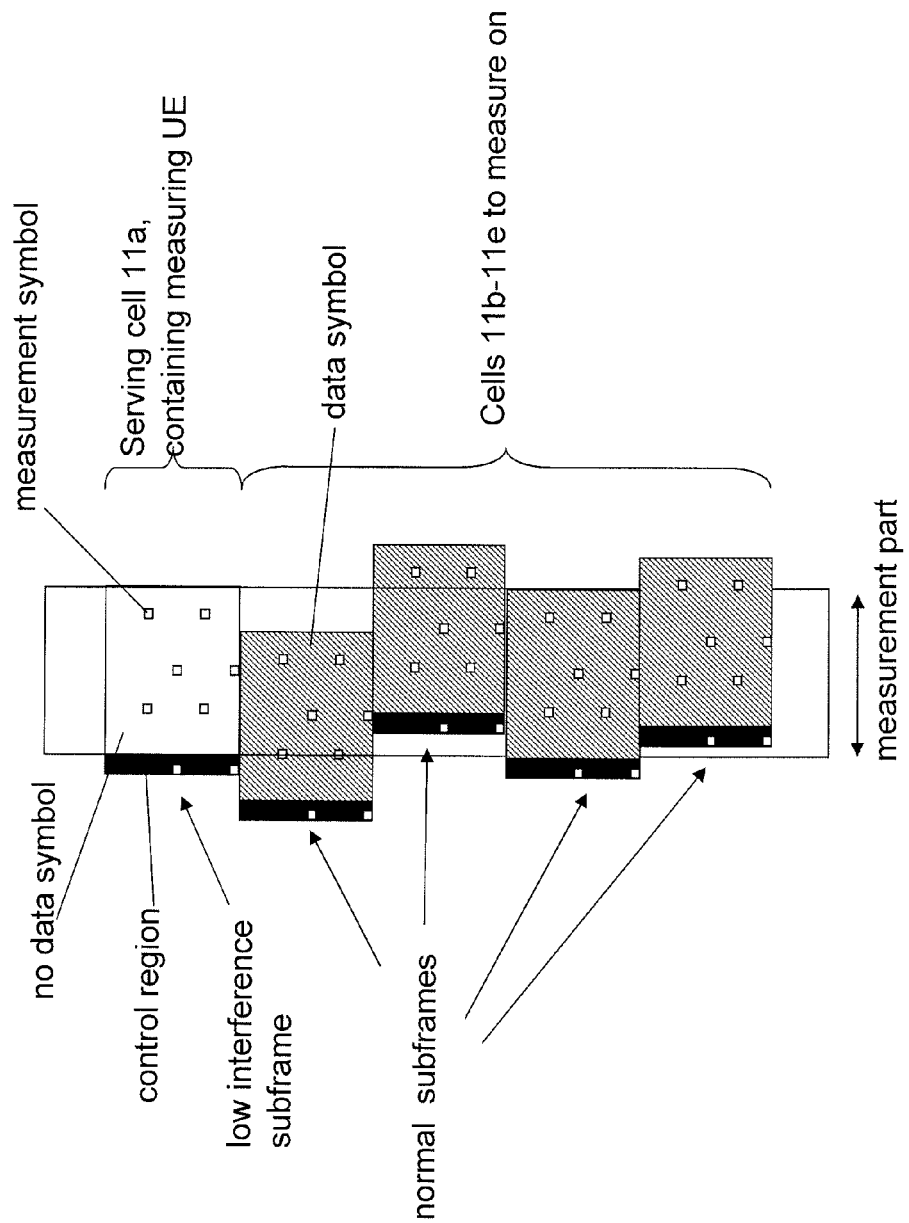
FIG. 2 is a schematic diagram illustrating an arrangement of subframes according to the prior art.

In an unsynchronized network, the timing of designated low interference subframes is in general not aligned. Thus the data symbols transmitted in the subframes from the eNodeBs 13b-13e in the neighborhood cells 11b-11e are overlapping with the measurement symbols of the cells 11b-11e the UE 12 is trying to measure on. This means that, although the designated low interference subframe in the serving cell is removing the strongest interferer (i.e. the own data symbols), hearability is still a challenging task. A schematic diagram illustrating an arrangement of subframes according to the described prior art is illustrated in FIG. 2. The control region of the subframe is indicated in black, the data symbols by hatching and the measurement symbols shown as small white squares. The large overlaid rectangle indicates the measurement part during which the data symbols are potentially interfering with the measurement symbols.

Figure 3:
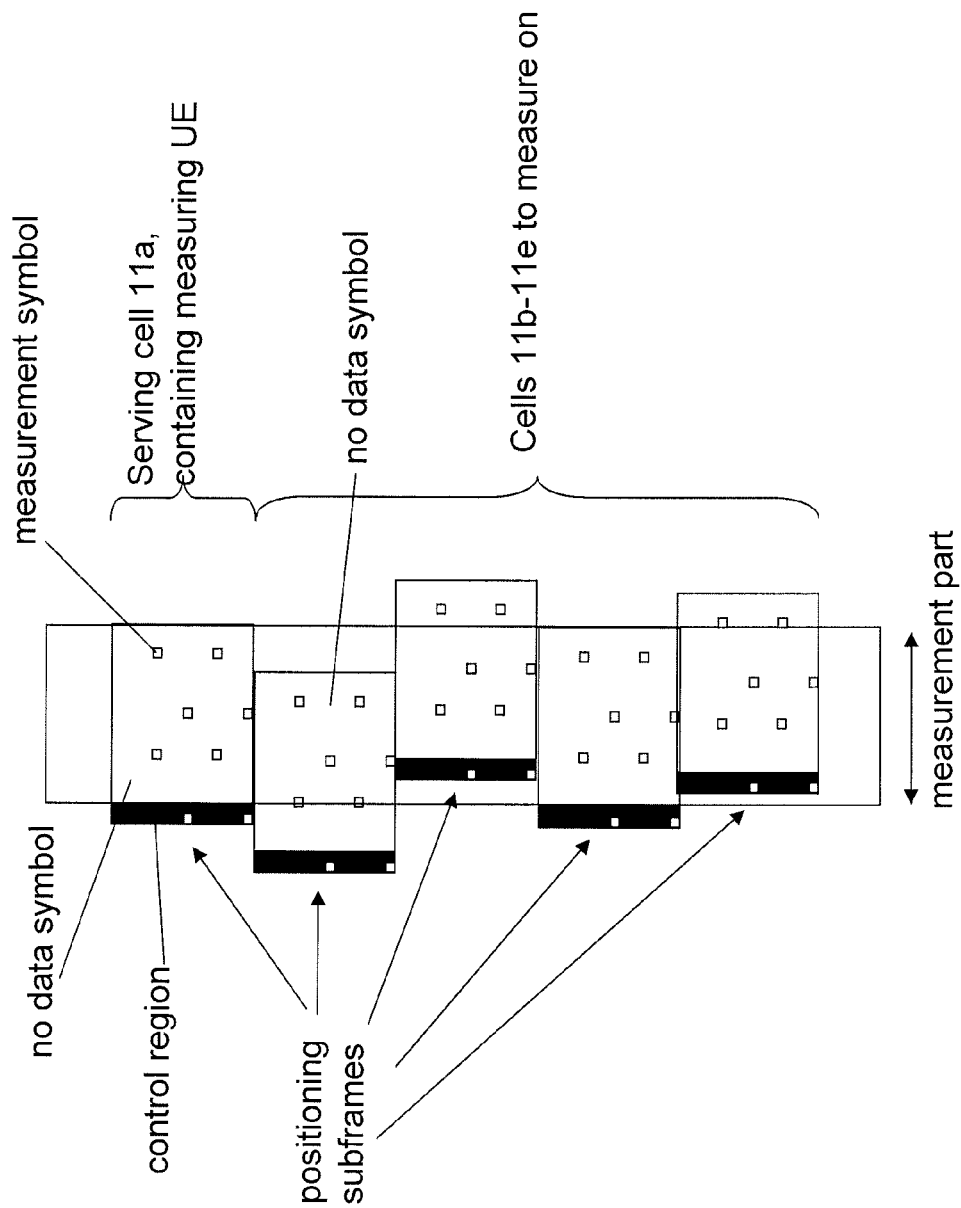
FIG. 3 is a schematic diagram illustrating an arrangement of positioning subframes in an unsynchronized network, resulting in coarse alignment.

The present invention provides methods and arrangement for scheduling positioning subframes for allowing aligning of positioning subframes across a number of cells 11a-11e in order to reduce the interference from data symbols of cells 11b-11e in the neighborhood of the cell 11a serving the UE 12 that is performing DL OTDOA measurements. A schematic diagram illustrating an arrangement of positioning subframes in an unsynchronized network implementing the present invention, resulting in coarse alignment, is illustrated in FIG. 3.

The invention provides methods and arrangement for scheduling positioning subframes, wherein a time instance during which transmission of the positioning subframes is to occur in a wireless communications network. The base stations in the wireless communications network are informed about the selected time instance, whereupon the base stations schedule and transmit the positioning subframes based on the selected time instance, whereby the positioning subframes are aligned throughout the part of the wireless communications network in which the base stations are comprised.

For the purpose of this disclosure, the term "positioning subframe" is to be interpreted as a subframe which causes no interference, or a limited amount of interference, with other subframes transmitted by another eNodeB on the same frequency resource. In practice, a positioning subframe could for example be a subframe which has no data scheduled in it, which has no data scheduled in a part or parts of it, or which has less than the maximum possible amount of data scheduled in it, or in a part or parts of it. A positioning subframe may also be interpreted as a subframe comprising at least one reference symbol (sometimes denoted reference signal, pilot symbol, or pilot signal) which is designed to enable measurements to be performed, e.g. by a UE. The measurements may, for instance, be utilized for positioning purposes. A positioning subframe may also be an MBSFN subframe. A MBSFN subframe is a subframe with only two OFDM (Orthogonal Frequency Division Multiplexing) symbols for PDCCH (Physical Downlink Control Channel). Other than that, it may be empty or contain some other form of reference symbol pattern or data.

It should be pointed out that in some embodiments of the present invention different types of positioning subframes are used in the participating eNodeBs, i.e. it is possible to use e.g. MBSFN subframes in some eNodeBs and other types of subframes without data in other eNodeBs.

We now turn to FIGS. 4-9 which show flowcharts of the methods and schematically block diagrams of the arrangements according to embodiments of the present invention.

Figure 4:
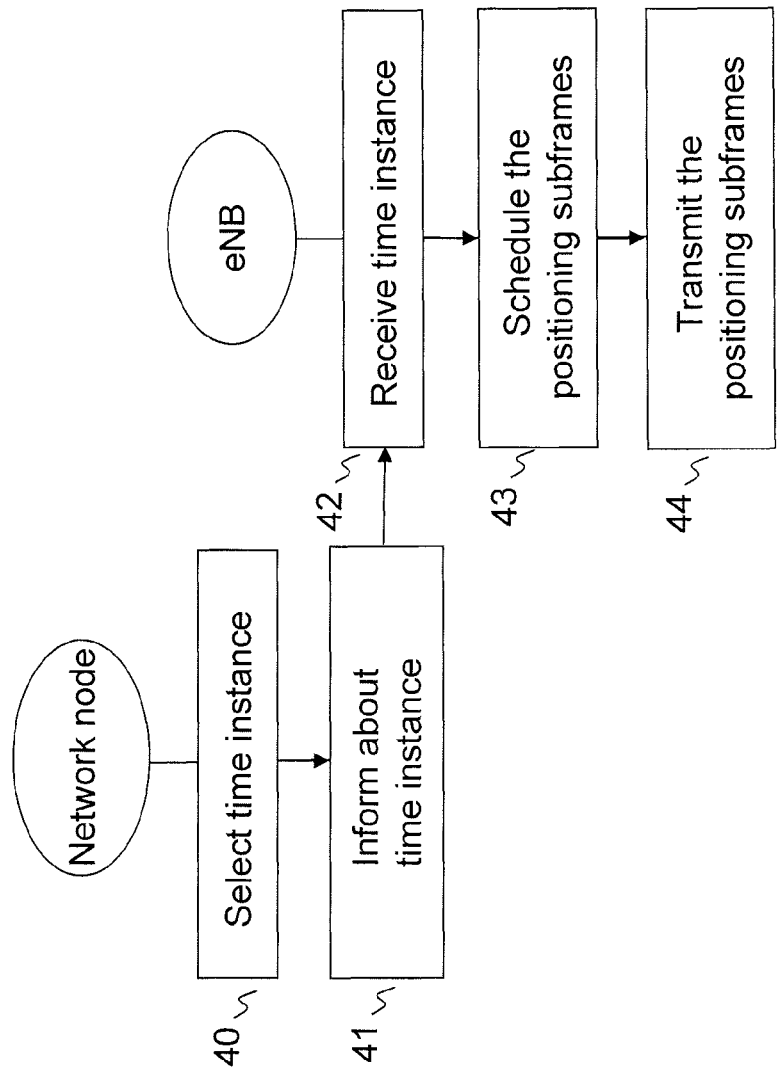
FIG. 4 illustrates a flowchart for scheduling positioning subframes wherein a positioning node selects the time instance for scheduling the positioning subframes and informs the neighboring eNodeBs about the time instance.

FIG. 4 illustrates a flowchart of a method in a network node and a base station according to one embodiment of the present invention. In a first step, the network node selects 40 a time instance during which transmission of the positioning subframes is to occur in the wireless communications network. In the next step, the network node informs 41 one or several eNodeBs 13 about the selected time instance. The one or several eNodeBs 13 receives 42 the time instance from the network node and schedules 43 the positioning subframes based on the received time instance. The positioning subframes are then transmitted 44 by the one or several eNodeBs 13 in accordance with the scheduling performed in the preceding step, whereby the positioning subframes are aligned.

In some embodiments of the present invention the positioning subframes are scheduled with a starting time which deviates less than or equal to half a subframe length from the selected time instance, resulting in coarse alignment, as illustrated in FIG. 3.

A wireless communication system utilizes global system frame numbers (SFNs) to base identification of frames of information transmitted by the communication system. The time instance during which the transmission of the positioning subframes is to occur is in one embodiment associated with a specific system frame number.

The network node could be a positioning node in the LTE, which could be a separate network node or integrated in an eNodeB or any other network node. In one embodiment the network node is an eSMLC (evolved Serving Mobile Location Center), which is either a separate network element or integrated functionality in the BSC that contains the functionality required to support location services.

Figure 5:
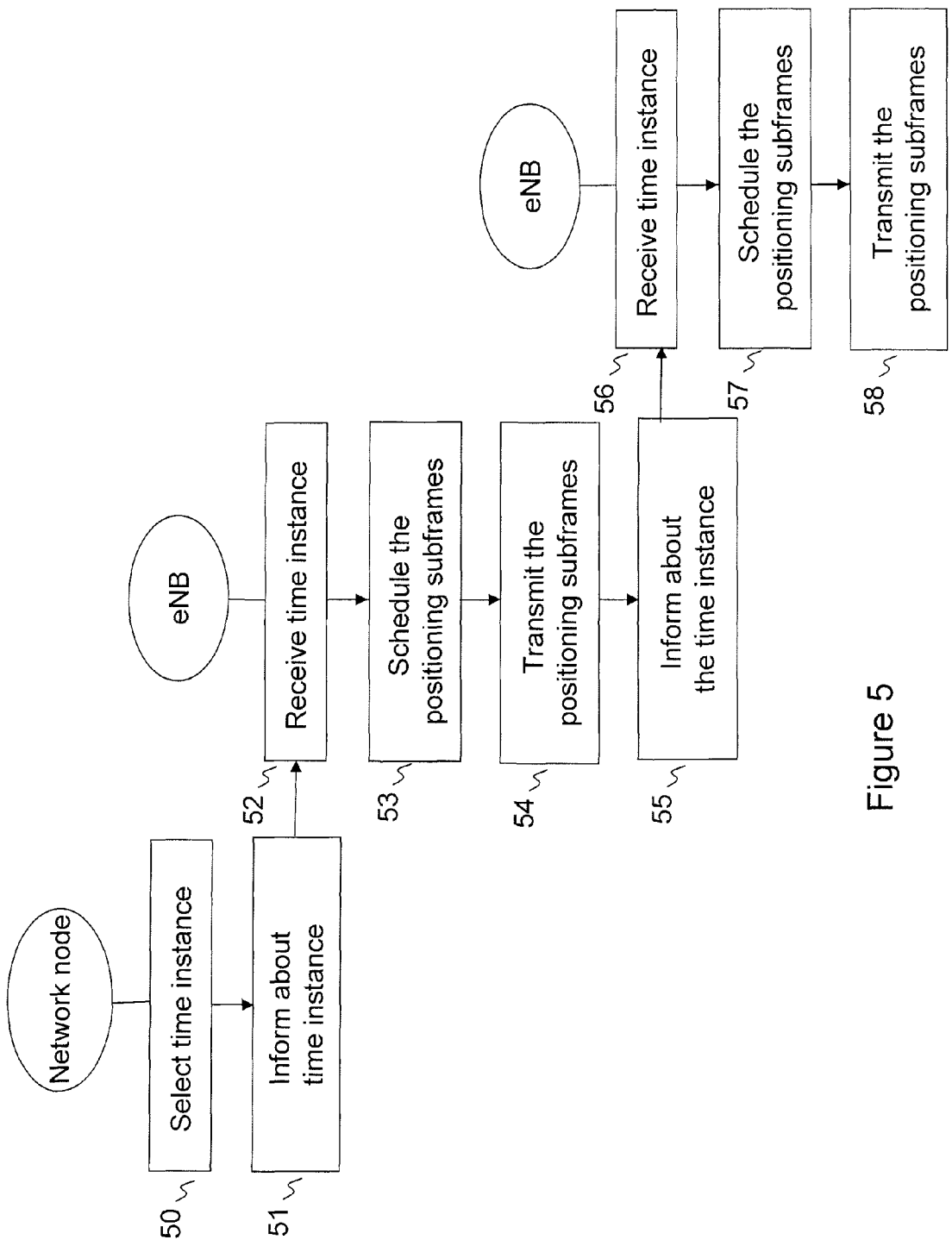
FIG. 5 illustrates a flowchart for scheduling positioning subframes wherein a positioning node selects the time instance for scheduling the positioning subframes and informs one or several eNodeBs about the time instance, whereupon the one or several eNodeBs informs the neighboring eNodeBs.

Another embodiment of the present invention is shown in FIG. 5, illustrating a flowchart of a method in a network node and base stations. In a first step, the network node selects 50 a time instance during which transmission of the positioning subframes is to occur in the wireless communications network. In the next step, the network node informs 51 one or several eNodeBs 13a about the selected time instance. The one or several eNodeBs 13a receives 52 the time instance from the network node and schedules 53 the positioning subframes based on the received time instance. The positioning subframes are then transmitted 54 by the one or several eNodeBs 13a in accordance with the scheduling performed in the preceding step. The one or several eNodeBs 13a then informs 55 other neighboring eNodeBs 13b-13e about the selected time instance in a further step of the method. The one or several neighboring eNodeBs 13b-13e receives 56 the time instance and schedules 57 the positioning subframes based on the received time instance. Further, the one or several neighboring eNodeBs 13b-13e transmits 58 the positioning subframes in accordance with the scheduling performed in the preceding step, whereby the positioning subframes are aligned throughout the part of the network comprising the participating eNodeBs 13a-13e. In one embodiment of the present invention the positioning subframes are aligned throughout the whole wireless communications network. In one embodiment the informing step 55 and the receiving step 56 are performed by sending a message from eNodeB 13a to the neighboring eNodeBs 13b-13e over an X2 interface.

Figure 6:
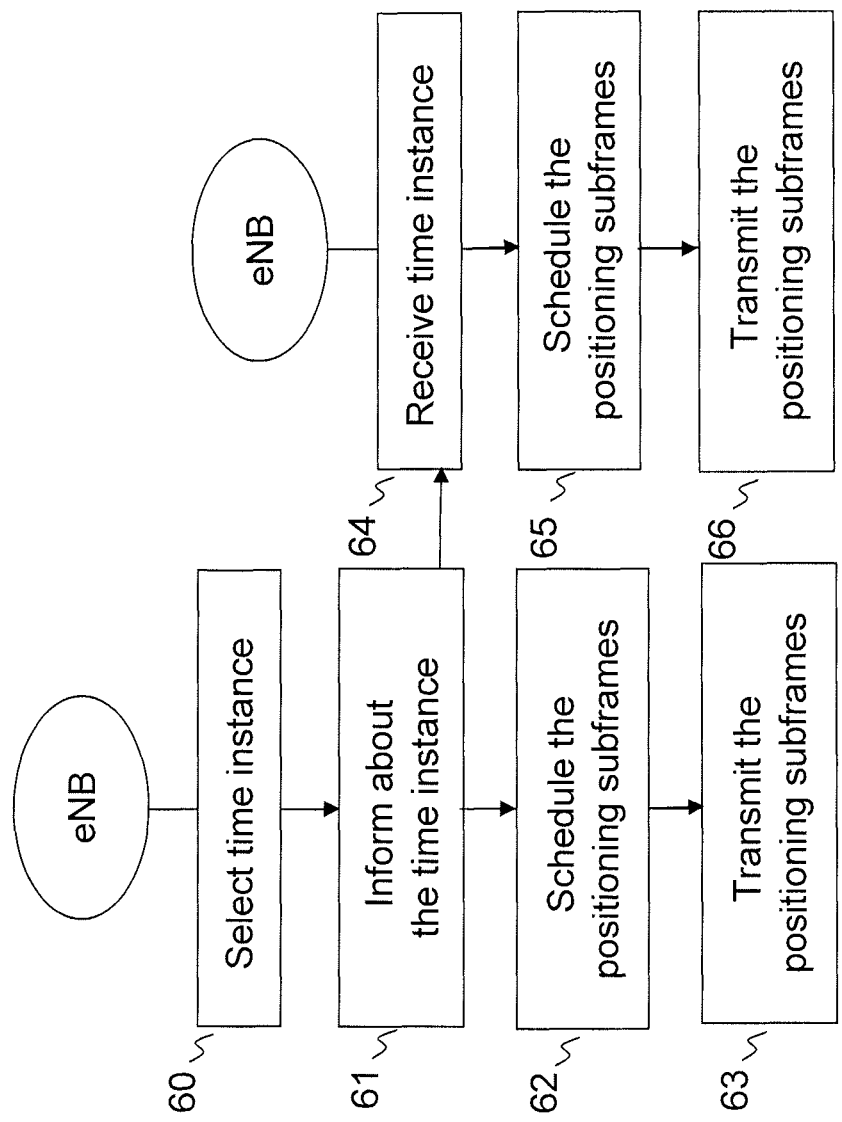
FIG. 6 illustrates a flowchart for scheduling positioning subframes wherein an eNodeB selects the time instance for scheduling the positioning subframes and informs the neighboring eNodeBs about the time instance.

Yet another embodiment of the present invention is shown in FIG. 6, illustrating a flowchart of a method in at least two base stations. In a first step, the eNodeB 13a selects 60 a time instance during which transmission of the positioning subframes is to occur in the wireless communications network. In the next step, the eNodeB 13a informs 61 one or several eNodeBs 13b-13e about the selected time instance. The eNodeB 13a schedules 62 the positioning subframes based on the received time instance. Further, the eNodeB 13a transmits 63 the positioning subframes in accordance with the scheduling performed in the preceding step. The one or several eNodeBs 13b-13e receives 64 information about the selected time instance and schedules 65 the positioning subframes based on the received time instance. Finally, the one or several eNodeBs 13b-13e transmits 66 the positioning subframes in accordance with the scheduling in the preceding step, whereby the positioning subframes are aligned throughout the part of the network comprising the participating eNodeBs 13a-13e. In one embodiment the informing step 61 and the receiving step 64 are performed by sending a message from the eNodeB 13a to the participating eNodeBs 13b-13e over the X2 interface.

Figure 7:
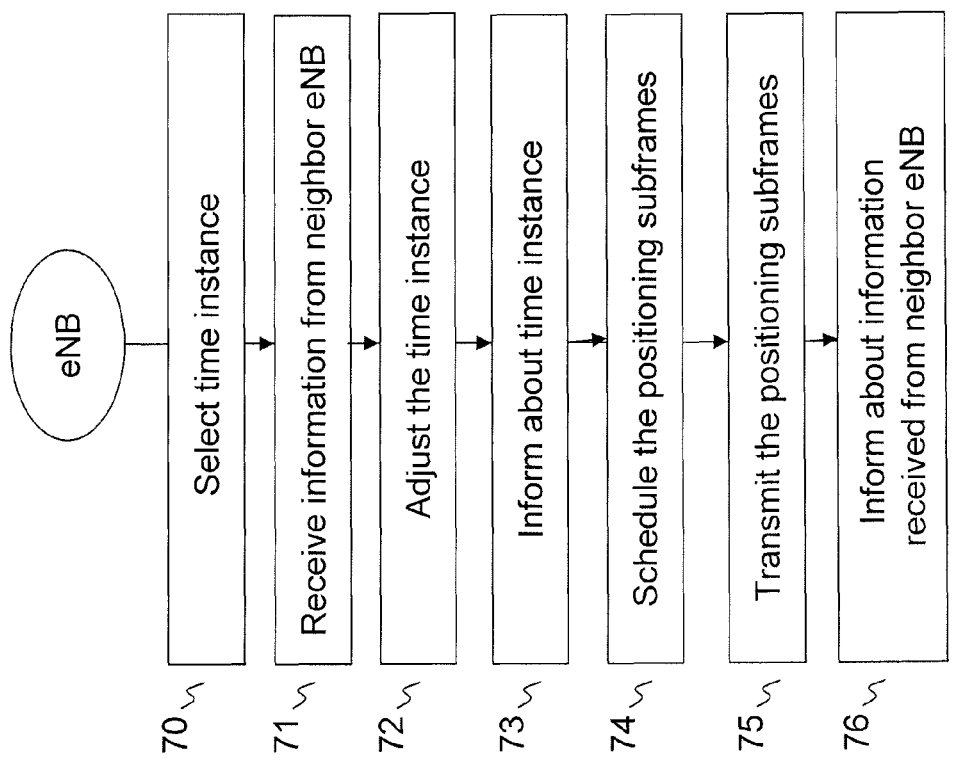
FIG. 7 illustrates a flowchart for scheduling positioning subframes wherein each eNodeB selects the time instance for scheduling the positioning subframes and informs the neighboring eNodeBs about the time instance, whereupon each eNodeB adjust the scheduling of the positioning subframes if needed.

Yet another embodiment of the present invention is shown in FIG. 7, illustrating a flowchart of a method in a base station. In a first step, the eNodeB 13a selects 70 a time instance during which transmission of the positioning subframes is to occur in the wireless communications network. In the next step, the eNodeB 13a receives 71 information from at least one neighboring eNodeB 13b comprised in the wireless communications network about a selected time instance selected by the neighboring eNodeB 13b. In one embodiment the receiving step 71 is performed by receiving a message from the neighboring eNodeB 13b over the X2 interface. In one embodiment the message also comprises information about the number of eNodeBs in the wireless communications network that schedule the positioning subframes at the received time instance. The eNodeB 13a then adjusts 72 the selected time instance according to the received time instance in the preceding step. In the next step, the eNodeB informs 73 the neighboring eNodeBs 13b about the adjusted time instance. In one embodiment the informing step 73 is performed by sending a message to the neighboring eNodeB 13b over the X2 interface. In one embodiment the message also comprises information about the number of eNodeBs in the wireless communications network that schedule the positioning subframes at the adjusted time instance. The eNodeB 13a schedules 74 the positioning subframes based on the adjusted time instance. Further, the eNodeB 13a transmits 75 the positioning subframes in accordance with the scheduling performed in the preceding step, whereby the positioning subframes are aligned throughout the part of the network comprising the participating eNodeBs 13a-13b. In a further embodiment the eNodeB 13a informs 76 a further eNodeB 13c about the adjusted time instance. Obviously, the method could be implemented in the whole wireless communications network, whereby the positioning subframes are aligned throughout the whole network.

One example of how the embodiment of the present invention illustrated in FIG. 7 could be implemented is outlined in the following. Other ways to implement the present invention could however also be possible.

If the number of eNodeBs following the timing, i.e. the time instance, for scheduling positioning subframes reported on X2 between the eNodeBs, is larger or equal to the number of eNodeBs following the timing of the eNodeB, i.e. the time instance selected by the eNodeB, receiving the message on X2, the receiving eNodeB adjusts its own timing according to the information received on X2. The receiving eNodeB also updates its own timing for scheduling positioning subframes if it has previously not received any timing report on X2. After adjusting its own timing the eNodeB should report its new timing to all its neighboring eNodeBs on X2. Moreover, another list of eNodeBs than the neighboring eNodeBs may also be applicable.

However, if the number of eNodeBs following the timing for scheduling positioning subframes reported on X2 is less than the number of eNodeBs following the timing of the eNodeB receiving the timing report on X2, the receiving eNodeB sends a timing report over X2 to all the eNodeBs that have different timing for scheduling positioning subframes. In the case wherein the eNodeB receives a timing report on X2 which corresponds to the same timing as currently used in the receiving eNodeB for scheduling positioning subframes, the receiving eNodeB updates its own list of eNodeBs following the timing according to the received message. The receiving eNodeB also sends it own list to the source eNodeB if the receiving eNodeB has knowledge about other eNodeBs that have the same timing but were not included in the report received on X2.

In some embodiments previously mentioned a system time instance is retrieved to which the selected and/or adjusted time instance is related. The system time instance is obtained from a GPS receiver or from a global system clock. The network node informs the one or several eNodeBs 13 about the system time information in some embodiments. In the embodiments wherein the system time information is available the selected and/or the adjusted time instance is related to the system time information i.e. the scheduling of the positioning subframes is based on both first time instance and the system time information.

Figure 8:
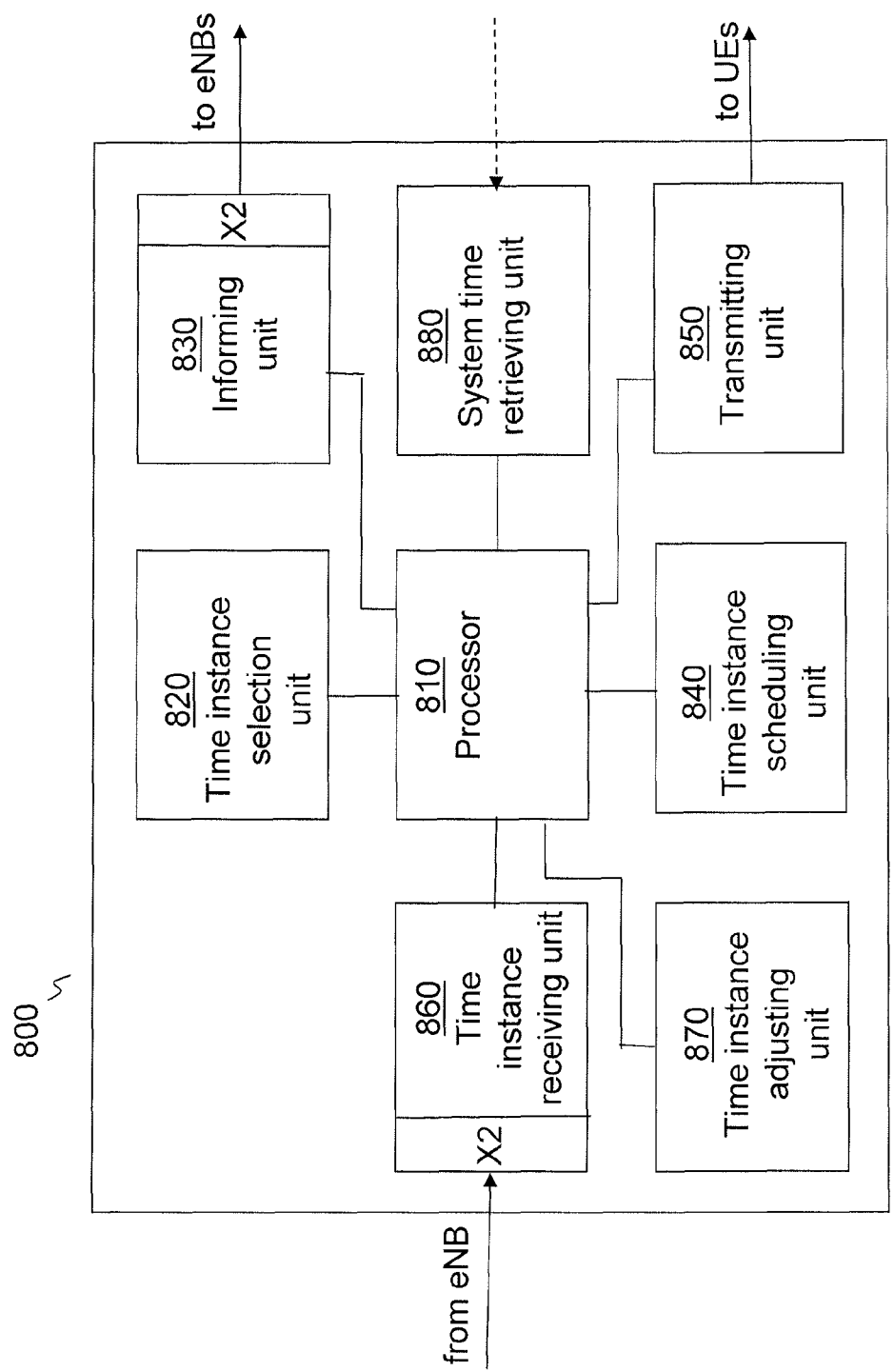
FIG. 8 is a schematic block diagram illustrating an arrangement in a network node such as a positioning node or base station.

To perform the method steps for scheduling positioning subframes, a network node may comprise an arrangement 800 depicted in FIG. 8. The arrangement 800 comprises a processor 810 and a time instance selection unit 820 arranged to select the time instance during which transmission of the positioning subframes is to occur. The arrangement further comprises an informing unit 830 arranged to inform the one or several eNodeBs 13a-13e about the time instance.

In some embodiment the network node comprising the arrangement is a positioning node 10, a SMLC or an eNodeB 13a.

In some embodiment, the network node is a base station i.e. an eNodeB 13a, wherein a scheduling unit 840 arranged to schedule the positioning subframes based on the time instance is comprised in the arrangement 800. The arrangement further comprises a transmitting unit 850 arranged to transmit the scheduled positioning subframes. In one embodiment, the arrangement comprises a receiving unit 860 arranged to receive information from another eNodeB 13b about a time instance used by that eNodeB 13b for scheduling positioning subframes. An adjusting unit 870 arranged to adjust the time instance according to the received time instance is comprised in the arrangement 800. In some embodiments the informing unit 830 is arranged to inform yet a further eNodeB 13c about the adjusted first time instance and/or the received time instance from the eNodeB 13b.

Additionally, the arrangement 800 comprises a retrieving unit 880 arranged to retrieve system time information obtained from a global clock or a GPS receiver in some embodiments of the present invention. In these embodiments the informing unit 830 is arranged to inform the eNodeB about the system time information.

Figure 9:
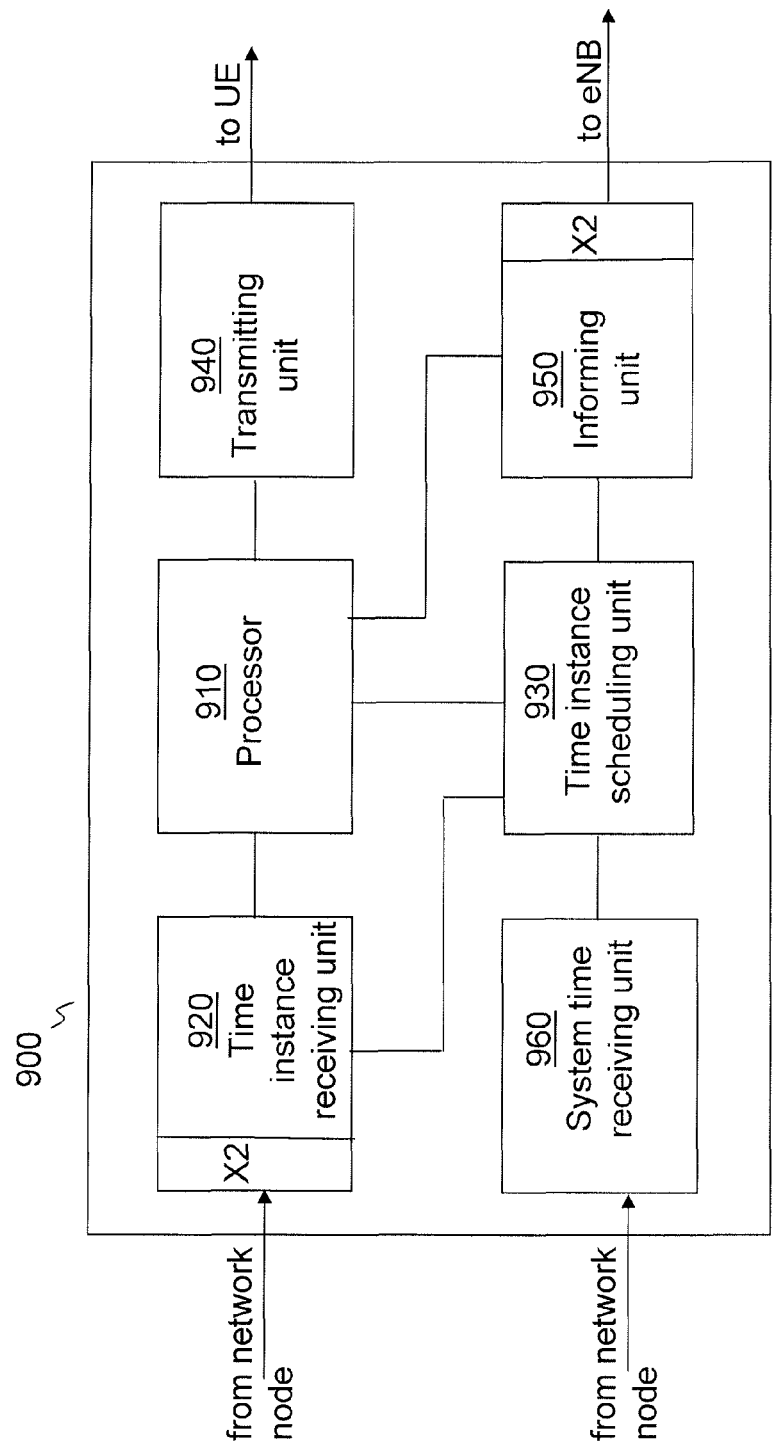
FIG. 9 is a schematic block diagram illustrating an arrangement in a base station.

To perform the method steps for scheduling positioning subframes, a base station, i.e. an eNodeB 13a, may comprise an arrangement 900 depicted in FIG. 9. The arrangement 900 comprises a processor 910 and a time instance receiving unit 920 arranged to receive the time instance during which transmission of the positioning subframes is to occur. The arrangement 900 further comprises a scheduling unit 930 arranged to schedule the positioning subframes based on the time instance. Moreover, the arrangement comprises a transmitting unit 940 arranged to transmit the scheduled positioning subframes. In some embodiments, the arrangement further comprises an informing unit 950 arranged to inform the one or several eNodeBs 13b-13e about the time instance.

Additionally, the arrangement 900 comprises a receiving unit 960 arranged to receive system time information, obtained from a global clock or a GPS receiver, from a network node in some embodiments of the present invention. In these embodiments the scheduling unit 930 is arranged to schedule the positioning subframes based on the time instance and the system time information.

It should be mentioned that the arrangement 900 comprises an X2 interface and in the embodiments wherein the network node is a base station the arrangement 800 also comprises an X2 interface.

It should be noted that the present invention is applicable in both Frequency Division Duplex (FDD) and Time Division Duplex (TDD) mode of the LTE.

Additionally, it should be noted that although terminology from 3GPP LTE has been used in this disclosure to exemplify the invention, this should not be seen as limiting the scope of the invention to only the aforementioned system. Other wireless systems, in particular OFDM-based systems such as WiMax, may also benefit from exploiting the ideas covered within this disclosure.

When using the word "comprise" or "comprising" it shall be interpreted as non-limiting, i.e. meaning "consist at least of".

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a network node for scheduling the transmission of positioning subframes from different base stations in an unsynchronized wireless communications network, wherein subframe boundaries are unsynchronized across the different base stations in the network, the method comprising:
    selecting a time period during which transmission of positioning subframes is to occur from one or more of the different base stations in the unsynchronized wireless communications network, by selecting the time period such that data-free portions of different positioning subframes to be respectively transmitted from the different base stations are to at least partly overlap in time;
    informing one or more of the base stations that positioning subframes are to be transmitted during the selected time period;
    scheduling the transmission of a positioning subframe from the network node based on at least the selected time period, wherein the network node is one of the different base stations, wherein said scheduling comprises scheduling the transmission of a positioning subframe to occur during a time period which deviates from the selected time period, but the scheduled time period deviates from the selected time period by a non-zero amount that is less than half the length of a subframe; and
    transmitting the scheduled positioning subframe.

2. The method according to claim 1, wherein normal subframes in the wireless communication network each include a region in which data is scheduled, and wherein data-free portions of positioning subframes in the unsynchronized wireless communication network comprise corresponding regions of positioning subframes in which no data is scheduled.

3. The method according to claim 1, wherein the positioning subframes are Multicast Broadcast Multimedia Single Frequency Network subframes.

4. The method according to claim 1, wherein the selected time period is associated with a system frame number.

5. The method according to claim 1, further comprising:
retrieving system time information obtained from a global system clock or a Global Positioning System receiver; and
informing the one or more base stations of the system time information.

6. The method according to claim 1, wherein the network node is a positioning node.

7. The method according to claim 1, wherein the network node is an evolved Serving Mobile Location Center.

8. The method according to claim 1, further comprising scheduling transmission of the positioning subframe from the network node also based on system time information.

9. The method according to claim 1, further comprising:
receiving information from another one of the base stations indicating that transmission of a positioning subframe from that base station is scheduled to occur during a time period that is different from the selected time period; and
adjusting the selected time period according to the time period indicated by the received information.

10. The method according to claim 9, further comprising informing one or more of the different base stations that transmission of positioning subframes is to occur during the time period indicated by the received information.

11. The method according to claim 9, wherein said receiving comprises receiving the information over an X2 interface.

12. A method in a base station of an unsynchronized wireless communications network for scheduling the transmission of a positioning subframe from that base station, wherein subframe boundaries are unsynchronized across different base stations in the network, the method comprising:
receiving from a network node information indicating a time period during which the transmission of positioning subframes is to occur from one or more different base stations in the unsynchronized network,
scheduling the transmission of a positioning subframe from said base station based on the time period indicated by the received information such that a data-free portion of the positioning subframe is to at least partly overlap in time with data-free portions of different positioning subframes to be respectively transmitted from one or more others of the different base stations, wherein said scheduling comprises scheduling the transmission of a positioning subframe to occur during a time period which deviates from the time period indicated by the received information, but the scheduled time period deviates from the indicated time period by a non-zero amount that is less than half the length of a subframe; and
transmitting the scheduled positioning subframe.

13. The method according to claim 12, wherein normal subframes in the wireless communication network each include a region in which data is scheduled, and wherein data-free portions of positioning subframes in the unsynchronized wireless communication network comprise corresponding regions of positioning subframes in which no data is scheduled.

14. The method according to claim 12, wherein the positioning subframes are Multicast Broadcast Multimedia Single Frequency Network subframes.

15. The method according to claim 12, wherein the time period indicated by the received information is associated with a system frame number.

16. The method according to claim 12, further comprising:
receiving system time information obtained from a global system clock or a Global Positioning System receiver; and
scheduling the transmission of the positioning subframe from said base station also based on said system time information.

17. The method according to claim 12, wherein said network node is a positioning node.

18. The method according to claim 12, wherein said network node is an evolved Serving Mobile Location Center.

19. The method according to claim 12, further comprising informing one or more of the different base stations that transmission of positioning subframes is to occur during the time period indicated by the received information.

20. The method according to claim 19, wherein the network node is a base station and said informing is performed over an X2 interface.

21. The method according to claim 20, wherein the network node is a base station.

22. A network node for scheduling the transmission of positioning subframes from different base stations in an unsynchronized wireless communications network, wherein subframe boundaries are unsynchronized across the different base stations in the network, wherein the network node comprises:
a selection circuit configured to select a time period during which transmission of positioning subframes is to occur from one or more of the different base stations in the unsynchronized wireless communications network, by selecting the time period such that data-free portions of different positioning subframes to be respectively transmitted from the different base stations are to at least partly overlap in time;
an informing circuit configured to inform one or more of the base stations that positioning subframes are to be transmitted during the selected time period;
a scheduling circuit configured to schedule the transmission of a positioning subframe from the network node based on at least the selected time period, wherein the network node is a base station, wherein the scheduling circuit is configured to schedule the transmission of a positioning subframe to occur during a time period which deviates from the selected time period, but the scheduled time period deviates from the selected time period by a non-zero amount that is less than half the length of a subframe; and
a transmitting circuit configured to transmit the scheduled positioning subframe.

23. The network node according to claim 22, further comprising a retrieving circuit configured to retrieve system time information obtained from a global system clock or a Global Positioning System receiver, and wherein the informing circuit is configured to inform the one or more base stations of the system time information.

24. The network node according to claim 22, wherein the network node is a positioning node.

25. The network node according to claim 22, wherein the network node is an evolved Serving Mobile Location Center.

26. The network node according to claim 22, further comprising:
a receiving circuit configured to receive information from another one of the base stations indicating that transmission of a positioning subframe from that base station is scheduled to occur during a time period that is different from the selected time period; and
an adjusting circuit configured to adjust the selected time period according to the time period indicated by the received information.

27. The network node according to claim 26, wherein the informing circuit is configured to inform one or more of the different base stations that transmission of positioning subframes is to occur during the time period indicated by the received information.

28. The network node according to claim 26, further comprising an X2 interface for receiving said information from another one of the base stations.

29. A base station of an unsynchronized wireless communications network for scheduling the transmission of a positioning subframe from that base station, wherein subframe boundaries are unsynchronized across different base stations in the network, the base station comprising:
- a receiving circuit configured to receive from a network node information indicating a time period during which the transmission of positioning subframes is to occur from one or more different base stations in the unsynchronized network;
- a scheduling circuit configured to schedule the transmission of a positioning subframe from said base station based on the time period indicated by the received information such that a data-free portion of the positioning subframe is to at least partly overlap in time with data-free portions of different positioning subframes to be respectively transmitted from one or more others of the different base stations, wherein the scheduling circuit is configured to schedule the transmissions of a positioning subframe to occur during a time period which deviates from the time period indicated by the received information, but the scheduled time period deviates from the indicated time period by a non-zero amount that is less than half the length of a subframe; and
- a transmitting circuit configured to transmit the scheduled positioning subframe.

30. The base station according to claim 29, wherein the receiving circuit is further configured to receive system time information obtained from a global system clock or a Global Positioning System receiver, and wherein the scheduling circuit is further configured to schedule the transmission of the positioning subframe from said base station also based on said system time information.

31. The base station according to claim 29, wherein said network node is a positioning node.

32. The base station according to claim 29, wherein said network node is an evolved Serving Mobile Location Center.

33. The base station according to claim 29, further comprising an informing circuit configured to inform one or more of the different base stations that transmission of positioning subframes is to occur during the time period indicated by the received information.

34. The base station according to claim 29, wherein the network node is a base station.

35. The base station according to claim 29, further comprising an X2 interface for receiving said information.

36. The method according to claim 1, wherein the time period is selected such that data-free portions of different positioning subframes to be respectively transmitted from the different base stations are to partly overlap in time.

37. The method according to claim 12, wherein the transmission of the positioning subframe from said base station is scheduled such that the data-free portion of the positioning subframe is to partly overlap in time with data-free portions of different positioning subframes to be respectively transmitted from one or more others of the different base stations.

* * * * *